T. KOPINSKI.
AGRICULTURAL MACHINE.
APPLICATION FILED FEB. 15, 1915.
1,159,959.
Patented Nov. 9, 1915.
3 SHEETS—SHEET 1.
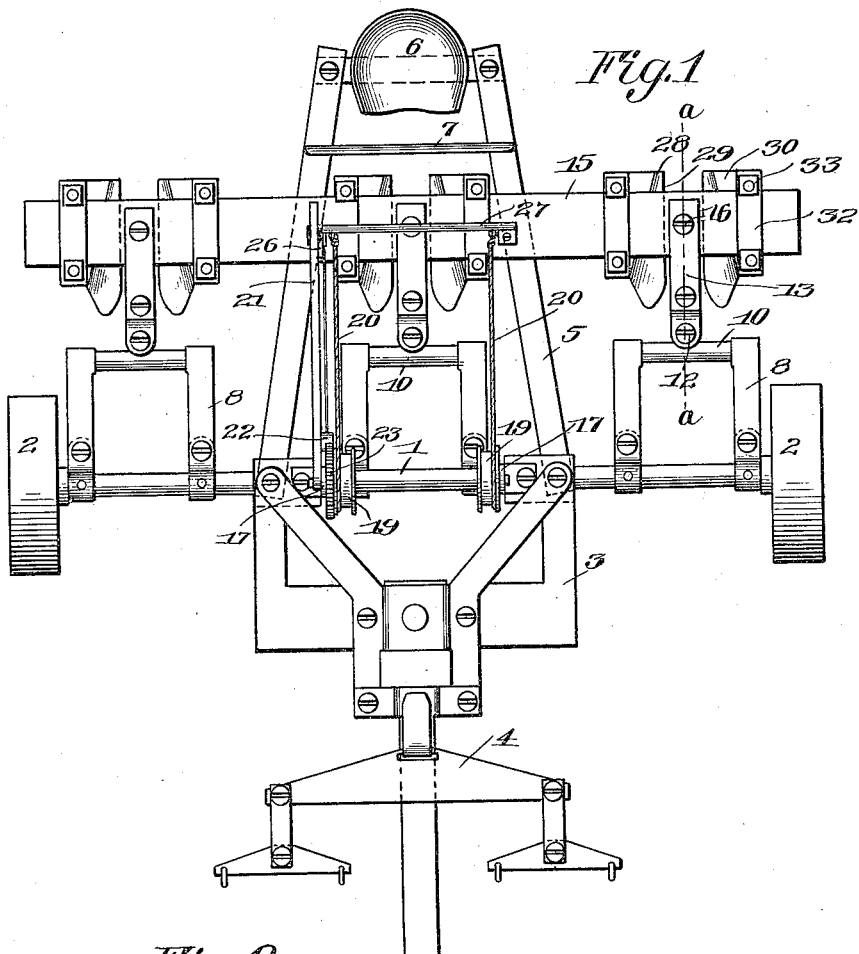
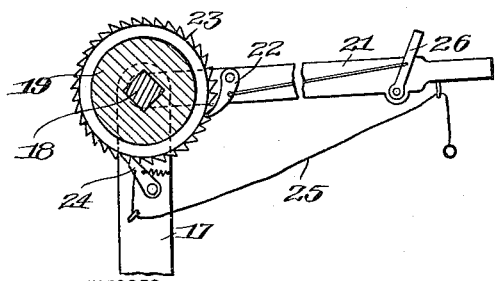
INVENTOR
Thomas Kopinski
BY
H. W. Simms
his ATTORNEY

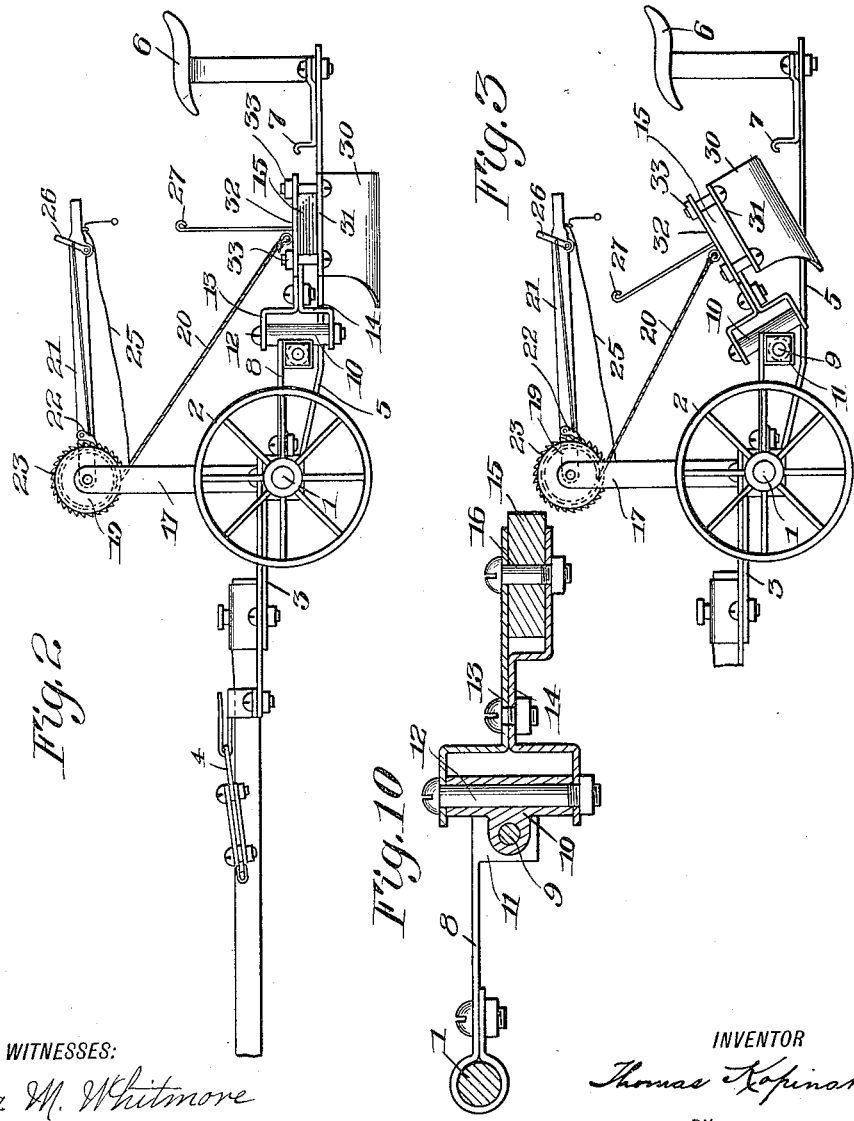

T. KOPINSKI.
AGRICULTURAL MACHINE.
APPLICATION FILED FEB. 15, 1915.
1,159,959.
Patented Nov. 9, 1915.
3 SHEETS—SHEET 3.
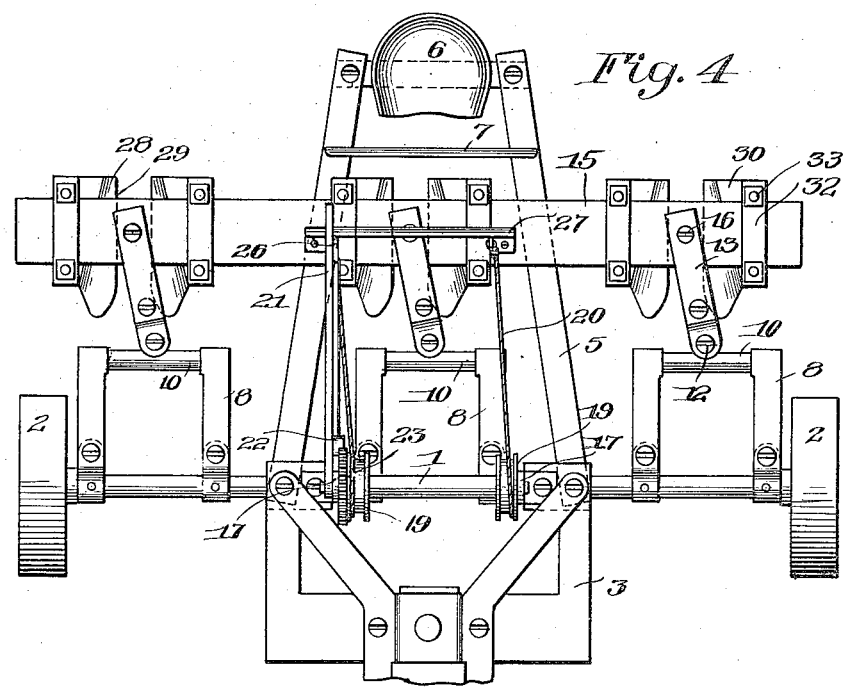
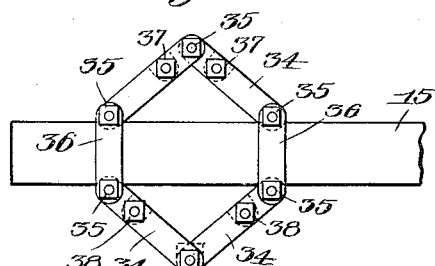
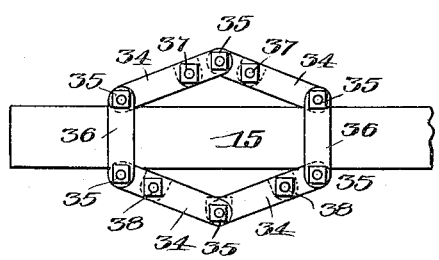
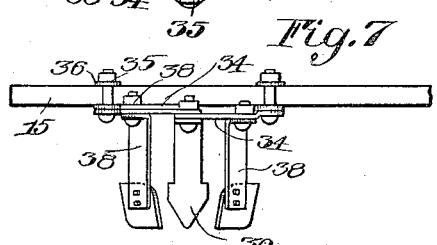
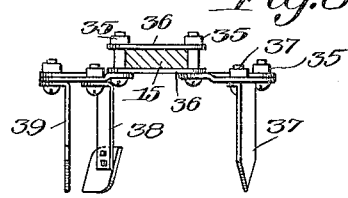
WITNESSES:
Ada W. Whitmore
Frances Jacubourz
INVENTOR
Thomas Kopinski
BY
H. H. Simms
his ATTORNEY

UNITED STATES PATENT OFFICE.

THOMAS KOPINSKI, OF ROCHESTER, NEW YORK.

AGRICULTURAL MACHINE.

1,159,959.  Specification of Letters Patent.  Patented Nov. 9, 1915.

Application filed February 15, 1915. Serial No. 8,180.

*To all whom it may concern:*

Be it known that I, THOMAS KOPINSKI, of Rochester, in the county of Monroe and State of New York, have invented a new and useful Improvement in Agricultural Machines, which improvement is fully set forth in the following specification and shown in the accompanying drawings.

The present invention relates to agricultural machines and more particularly to the type having tools for operating in the soil, and an object of the invention is to provide a simple and inexpensive construction by which tools may operate simultaneously upon a plurality of planted rows and be caused to follow such rows.

Another object of the invention is to improve the tool arrangement and construction so that a better working of the soil is obtained.

To these and other ends the invention consists in certain parts and combination of parts all of which will be hereinafter described, the novel features being pointed out in the appended claims.

In the drawings: Figure 1 is a plan view of a machine embodying the present improvements; Fig. 2 is a side elevation of the same machine; Fig. 3 is a view similar to Fig. 2 showing the tools in elevated position; Fig. 4 is a view similar to Fig. 1 showing the tools shifted slightly in a lateral direction; Fig. 5 is a plan view of a tool frame adapted to be used for this machine and different from those illustrated in Figs. 1 to 4; Fig. 6 is a view of the same tool frame in a differently adjusted position; Fig. 7 shows the tool frame of Fig. 5 in elevation with the tools arranged thereon; Fig. 8 shows the same parts in side elevation; Fig. 9 is a detail view of the tool-bar elevating mechanism; and Fig. 10 is a section on the line *a—a* Fig. 1.

Referring more particularly to the drawings 3 indicates a frame having a non-rotating axle 1 on which the ground wheels 2 turn. This frame 3 has the draft means 4 of any suitable character secured thereto, and it preferably embodies two rearwardly-extending arms 5 which support a seat 6 and which are connected by a cross piece 7 serving as a foot piece for the occupant of the seat. Extending rearwardly from the axle 1, is a plurality of arms 8 arranged in pairs, each arm having a downwardly-turned portion 11 and these downwardly-turned portions on each pair are connected by a rod bearing 9 on which a coupling 10 turns about a horizontal axis, the ends of the coupling abutting depending portions 11 to be held against axial movement. Turning in the coupling 10 about an axis at right angles to the axis 9 is a pivot member 12 to which is secured a link preferably formed of two straps 13 and 14 separated at one of their ends to embrace the coupling 10 in order to connect with opposite ends of the pivot member 12 and separated at their other ends in order to receive between them a tool-carrying bar 15, said bar lying between the separated ends of all of said plates 13 and 14 so as to be supported at a plurality of points throughout its length. A bolt 16 passes through each pair of plates 13 and 14 and the tool-carrying bar 15 to provide a pivotal connection between the bar and the link so that each link is arranged to turn about a vertical axis on the bar. This whole connection permits the bar to be moved longitudinally in a line transverse of the median vertical plane of the machine, this being effected by the pivot members 12 and 16 permitting the links to move on the frame pieces 10 and also on the tool-carrying bar 15. The tool carrying bar may also be raised and lowered about the axis 9, its lowermost position being preferably determined by the arms 5 above which the tool-carrying bar 15 operates at a point in advance of the seat 6. The longitudinal movement of the bar may be effected by an operating member 27 in the form of a bar or rod supported horizontally above and on the longitudinally movable tool-carrying bar 15 in proximity to the seat 6 so that the operator may cause the tools on the bar to follow any rows.

Any suitable means may be employed for raising and lowering the tool-carrying bar. In this instance, standards 17 rise in parallel relation from the frame 3 and carry a shaft 18 at their upper ends. On this shaft, winding drums 19 are arranged and have connected thereto cables 20 which are connected at their other ends to the tool-carrying bar 15. The winding of the cables 20 on the drums 19 may be effected by a lever 21 which turns loosely on the shaft 18 and extends rearwardly to the seat 6. This lever may carry a spring-pressed pawl 22 for coöperation with the ratchet 23 on the shaft 18, said pawl 22 riding over the ratchet when the lever is elevated and causing the ratchet with the shaft 18 to turn therewith when the lever is lowered. A spring-pressed pawl 24 on the standard 17 holds the ratchet in its adjusted position and this pawl 24 may be moved out of holding position by an operating connection 25 which extends to the grip of the lever 21. Also arranged near said grip is an operating member 26 which may be employed for moving the pawl 22 out of engagement with the ratchet 23, the tool-carrying bar 15 lowering when both pawls 22 and 24 release the ratchet and being elevated when the lever 21 is oscillated to turn the ratchet wheel 23.

The tools may be of any suitable construction to perform the desired work. In Figs. 1 to 4, the tools are designed for hilling while in Figs. 5 to 8 the tools are designed for cultivating.

The hilling tools are formed by shovels arranged in pairs, the members of which throw the dirt toward each other. In this instance, each shovel is provided with an inturned portion 28 arranged at its lower edge said inturned portion gradually decreasing in width toward the rear end of the shovel while having its free edge 29 substantially transverse of the bar 15 so that the two shovels have their free edges substantially parallel. An upright wall 30 rises from the inturned portion 28 and converges rearwardly with reference to the free edge 29. At its upper edge, this upright wall carries an outwardly-turned portion 31 which abuts the under surface of the bar 15 and is held against the bar by a plate 32 above the bar and bolts 33 passing through the plate 32 and the outwardly-turned portion 31. With this arrangement, the members of a pair of shovels travel on opposite sides of a row, their forward portions gathering up the dirt which is then carried by the side walls into a hill about the row of plants.

According to the embodiment shown in Figs. 5 to 8, a tool carrying frame is provided which embodies six links 34 pivoted together end to end, at 35 to provide a continuous structure. Two of these links abut the under side of the tool-carrying bar 15 and are held thereto by plates 36 which engage the upper side of the bar 15, some of the pivot bolts 35 being extended to connect the links 36 with the tool-carrying frame. It is apparent that the distance between the plates 36 will determine the angular relation of the links 34, so that this frame may be utilized for carrying a number of tools and for varying the distances between the tools merely by shifting the positions of the plates 36 on the bar 15. In this instance, the two forward links 34 each has a cultivator tooth 37 depending therefrom in proximity to their common pivot 35 while the rear links 34 each has a cultivator tooth 38 depending therefrom in proximity to the plates 36 and a central tooth 39 at their common pivot 35. The forward teeth 37 throw the dirt on both sides thereof and this is also the case with the rear central tooth 39, but the rear side teeth 38 act so that one throws the dirt to one side and the other throws the dirt to the other side. These tools may be made to follow the planted rows by shifting the bar 15 longitudinally, and the lines on which the tools of each tool-carrying frame operate, may be changed so as to bring them closer together or farther apart, this being effected by shifting the links 36 on the bar 15.

With a machine constructed in accordance with this invention, any suitable number of tools may be employed to operate on different planted rows, and these tools may be located at any distance apart. The means for effecting these adjustments is simple and there are no complicated parts liable to get out of order.

What I claim as my invention and desire to secure by Letters Patent is:—

1. In an agricultural machine, the combination with an axle, means extending rearwardly from the axle, wheels mounted to turn on the axle, arms extending rearwardly from the axle in pairs, couplings each pivotally connected to a pair of said arms to swing about a horizontal axis, parallel links pivoted to said frames to swing about vertical axes, a bar arranged horizontally above the rearwardly extending means to have its downward movement limited by said rearwardly extending means, and having the links pivotally connected thereto, an operating member projecting upwardly from the bar by which the bar may be moved in the direction of its length, means having a flexible connection with the bar to effect the raising and lowering of the bar, and tools supported by said bar.

2. In an agricultural machine, an axle, means extending rearwardly from the axle, wheels arranged on the axle, a horizontal bar extending transversely of the machine above the rearwardly extending means to have its downward movement limited by said means, tools carried by said bar, means for supporting said bar for vertical movement relatively to the rearwardly extending means, means for supporting the bar for free longitudinal movement, and an operating member for the bar.

3. An agricultural machine, a main frame, a bar extending transversely of the machine for operating over a plurality of planted rows, parallel links pivotally connected to said bar on vertical axes, couplings mounted to turn about a common horizontal axis on the main frame and having the links pivoted thereto to turn about vertical axes and tools for operating between the different rows.

4. An agricultural machine comprising a wheeled frame, a horizontally-arranged bar extending transversely of the frame, tools carried by said bar, a plurality of couplings mounted to turn on the wheeled frame about a common horizontal axis, and a plurality of parallel links, each pivoted to one of said frames to turn about a vertical axis and each pivoted to the tool-carrying bar to turn about a vertical axis.

5. In an agricultural machine, a supporting bar, a tool-carrying frame embodying a plurality of pivotally-connected links adjustable longitudinally of the bar, and tools carried by said links.

6. In an agricultural machine, a supporting bar, a plurality of tool-carrying frames adjustable longitudinally of the bar relatively to each other and each embodying a plurality of pivotally-connected links, and tools carried by said links.

7. In combination with a transversely extending bar, six pivotally connected links, two of which are adjustably secured to the bar and the other four project forwardly and rearwardly from the bar, the two forward links having tools depending therefrom near their common pivot, and the two rearwardly extending links having a tool depending therefrom at their common pivot and also adjacent their pivotal connection with the links which are secured to the bar.

THOMAS KOPINSKI.

Witnesses:
 H. H. SIMMS,
 ADA M. WHITMORE.

Copies of this patent may be obtained for five cents each, by addressing the "Commissioner of Patents, Washington, D. C."